Dec. 5, 1961 T. WARMING 3,011,812
CROSSHEAD CONNECTION
Filed March 28, 1960

INVENTOR
TROELS WARMING
BY
HIS ATTORNEY

United States Patent Office 3,011,812
Patented Dec. 5, 1961

3,011,812
CROSSHEAD CONNECTION
Troels Warming, Corning, N.Y., assignor to Ingersoll-Rand Company, New York, N.Y., a corporation of New Jersey
Filed Mar. 28, 1960, Ser. No. 17,977
5 Claims. (Cl. 287—100)

This invention relates in general to connections between two reciprocating members, and more particularly to the connection of a connecting rod to a crosshead such as used in engines.

It is an object of this invention to provide an improved construction for the connection between a crosshead and its associated connecting rod, compared to the presently known connecting arrangements.

Another object of this invention is to provide an improved construction for the connection between a crosshead and the connecting rod in which the size of the associated connecting rod end is reduced, compared to the presently known connecting arrangements.

Still another object of this invention is to provide a construction which is efficient, economic, and simple for assembly and disassembly.

Figure 1:
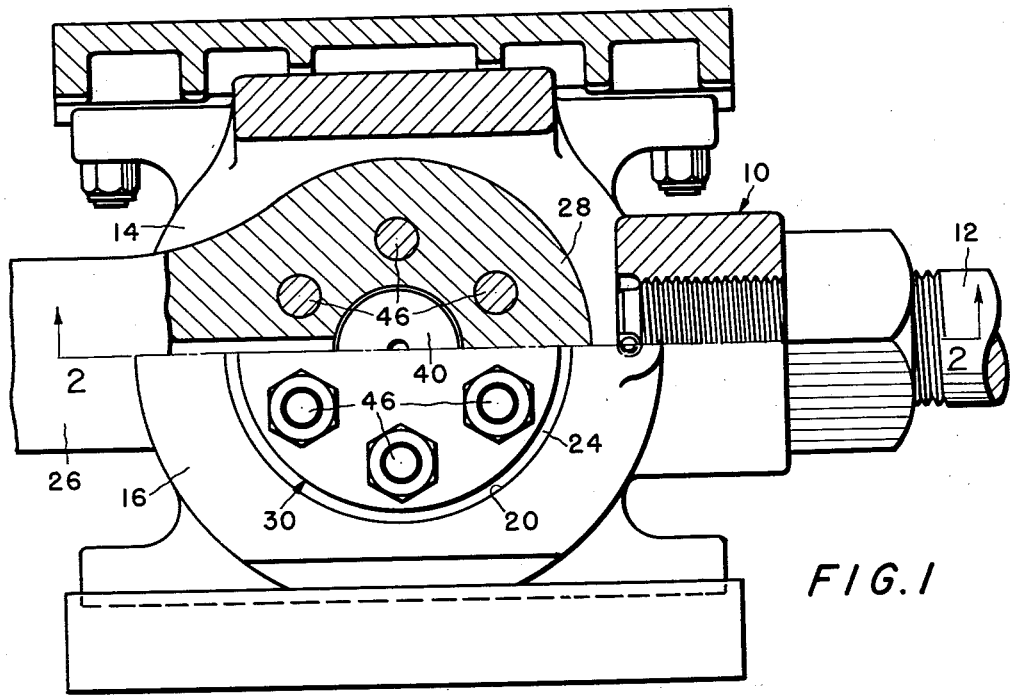
Figure 2:
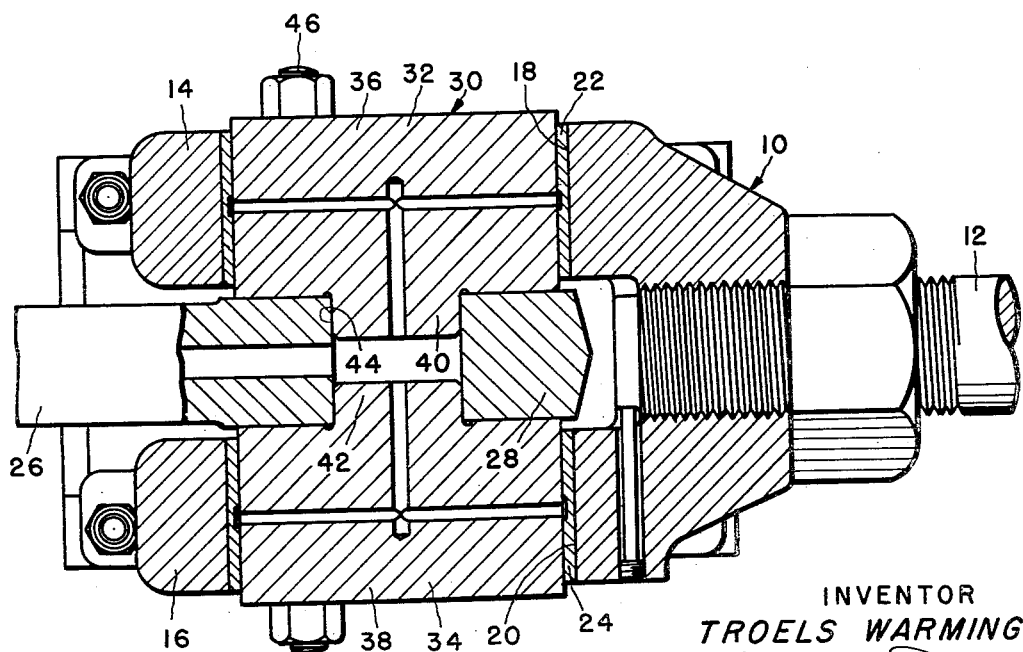

The advantages of this invention will appear more fully from the following description made in connection with the accompanying drawing, in which:

FIGURE 1 is a crosshead connection showing the upper portion in longitudinal section and the lower portion in plan view, and FIG. 2 shows a section of FIG. 1 taken along the line 2—2.

Referring now more particularly to the drawing, 10 designates a crosshead such as used in engines, to which, at its one end, a piston rod 12 is connected in a well known manner to move in a straight line with the crosshead. The crosshead 10 includes two opposing side members 14 and 16 spaced from each other and positioned substantially parallel relative to each other. The side members 14 and 16 are each provided with a bore 18 and 20, respectively, the bores, having the same diameter, positioned in axial alignment with each other and their common axis perpendicular relative to the axis of the piston rod 12.

The bores 18 and 20 are equipped with bearings 22 and 24, respectively, preferably of a sleeve type.

A connecting rod 26, of which the end portion 28 is positioned between the side members 14 and 16, is to be connected to the crosshead, and in order to achieve this connection according to this invention, a novel type wrist pin 30 is provided.

The wrist pin 30 is in sections, 32 and 34, each section having a portion, 36 and 38, respectively, to slidably fit in the bearings 22 and 24, respectively, and a reduced portion, 40 and 42, respectively. The reduced portions 40 and 42 are to be inserted in a bore 44 drilled through the end portion 28 of the connecting rod 26, as will be explained hereinafter.

When the connecting rod 26 is to be connected to the crosshead 10, the end portion 28 of the connecting rod 26 is positioned such that the bore 44 of the connecting rod is in axial alignment with the bearings 22 and 24. The wrist pin sections 32 and 34 are then assembled such that the portions 36 and 38 of the wrist pin sections are positioned in the bearings 22 and 24, respectively, and the reduced portions 40 and 42 are inserted in the bore 44 of the connecting rod. To complete this connection the sections 32 and 34 of the wrist pin 30 are connected to each other by bolts 46 such that the connecting rod end portion 28 is clamped between the wrist pin sections 32 and 34, as shown in FIG. 2.

In order to insure a proper clamping of the connecting rod end portion 28 between the wrist pin sections 32 and 34, the reduced portions 40 and 42 are held spaced from each other in the bore 44 so that these reduced portions will not abut.

It is to be noted that, with this type connection arrangement the connecting rod end portion 28 can be made smaller and more economical to manufacture, compared to the presently known crosshead connections in which the bearing is located in the associated connecting rod end and the wrist pin is to be in proportion with the required bearing area.

It is also to be noted that the connection arrangement, according to this invention, is simple for assembly as well as disassembly for the connecting rod end relative to the crosshead.

It should be understood that the description and drawing herein are illustrative only, and that various changes and modifications may be made in the structure disclosed without departing from the spirit of the invention.

I claim:

1. A pivotal connection between two members, including a pin comprising separable sections, a pin holding member and a pin receiving member, said pin receiving member having spaced side members to receive therebetween an end portion of said pin holding member, each of said side members having a bore in which a section of said pin is slidably received, and means to rigidly secure said pin sections to said end portion of said pin holding member to prevent movement of said pin sections relative to said end portion of said pin holding member.

2. A pivotal connection between two members, including a cylindrical pin comprising separable sections, a pin holding member and a pin receiving member, said pin receiving member having opposing side members spaced from each other to receive therebetween an end portion of said pin holding member, each of said side members having a bore in axial alignment with each other into which a section of said pin is slidably inserted, and means to rigidly connect said sections to each other and to said end section of said pin holding member to prevent movement of said pin sections relative to said end portion of said pin holding member.

3. A connection between two members, comprising a cylindrical pin in sections, each of said sections having a portion of reduced diameter relative to the other portion of said section, a pin holding member and a pin receiving member, said pin receiving member having opposing side members spaced from each other to receive therebetween the end portion of said pin holding member, said end portion of said pin holding member having a bore to receive the reduced portions of said pin sections, each of said side members having a bore with a bearing mounted therein, said bearings being in axial alignment with each other to slidably receive the other section of said pin sections, and means to rigidly connect said sections with each other and to said end portion of said pin holding member to prevent movement of said pin sections relative to said end portion of said pin holding member.

4. A connection between two reciprocating members, comprising a first member having a recess with an open end bounded by two opposing sides, each of said sides having a bore in axial alignment with each other, a bearing in each of said bores, a second member having one end portion projecting in said recess, a wrist pin in sections including a first section rigidly connected to one side of said end portion of the second member having a portion extending into and slidably fitting the bearing in one of said sides of said first member, the second section of said wrist pin rigidly connected to the other side of said end portion of the second member having a portion extending into and slidably fitting the bearing in the other of said sides of the first member, and means to centralize said two sections of the wrist pin relative to each other and relative to said bearings.

5. A connection between two reciprocating members, comprising a first member having a recess with an open end bounded by two opposing sides, each of said sides having a bore in axial alignment with each other, a bearing in each of said bores, a second member having one end portion provided with a bore of smaller diameter than the diameter of the bearings in said sides inserted through said open end into said recess such that the bore in said second member is in axial alignment with the bearings in said sides, a wrist pin in sections, each of said sections having a portion adapted to slidably fit the bearings in said sides of the first member and another portion adapted to be inserted into the bore of said second member, the inner ends of the last said portions being spaced from each other when said last said portions are fully inserted in the bore of said second member, and means to rigidly connect said sections to each other and to said end portion of said second member to prevent movement of said pin sections relative to said end portion of said pin holding member.

References Cited in the file of this patent

UNITED STATES PATENTS

| | | |
|---|---|---|
| 817,922 | Koroknay | Apr. 17, 1906 |
| 1,331,573 | McKechnie et al. | Feb. 24, 1920 |
| 1,922,707 | Newcomb | Aug. 15, 1933 |

FOREIGN PATENTS

| | | |
|---|---|---|
| 393,108 | France | Oct. 15, 1908 |